(12) United States Patent
Gebauer

(10) Patent No.: US 9,601,029 B2
(45) Date of Patent: Mar. 21, 2017

(54) METHOD OF PRESENTING A PIECE OF MUSIC TO A USER OF AN ELECTRONIC DEVICE

(71) Applicant: Simon Gebauer, Filderstadt (DE)

(72) Inventor: Simon Gebauer, Filderstadt (DE)

(73) Assignee: CARUS-VERLAG GMBH & CO. KG, Stuttgart (DE)

(*) Notice: Subject to any disclaimer, the term of this patent is extended or adjusted under 35 U.S.C. 154(b) by 0 days.

(21) Appl. No.: 14/845,519

(22) Filed: Sep. 4, 2015

(65) Prior Publication Data

US 2016/0071429 A1   Mar. 10, 2016

(30) Foreign Application Priority Data

Sep. 5, 2014 (EP) .................................. 14003079

(51) Int. Cl.
| | |
|---|---|
| *G09B 15/06* | (2006.01) |
| *G09B 15/02* | (2006.01) |
| *G10G 1/00* | (2006.01) |
| *G01H 1/00* | (2006.01) |
| *G09B 15/00* | (2006.01) |

(52) U.S. Cl.
CPC ............. *G09B 15/023* (2013.01); *G01H 1/00* (2013.01); *G09B 15/002* (2013.01); *G10G 1/00* (2013.01)

(58) Field of Classification Search
CPC ...... G09B 15/023; G09B 15/002; G10G 1/00; G10H 1/00
See application file for complete search history.

(56) References Cited

U.S. PATENT DOCUMENTS

| | | | |
|---|---|---|---|
| 5,690,496 A | 11/1997 | Kennedy | |
| 6,084,168 A * | 7/2000 | Sitrick | G09B 15/023 84/477 R |
| 6,169,239 B1 * | 1/2001 | Aiardo | G09B 15/023 84/464 A |
| 7,239,320 B1 | 7/2007 | Hall et al. | |
| 2001/0037719 A1 * | 11/2001 | Gardner | G09B 15/023 84/478 |
| 2003/0024375 A1 * | 2/2003 | Sitrick | G09B 15/002 84/477 R |

(Continued)

*Primary Examiner* — Jeffrey Donels
(74) *Attorney, Agent, or Firm* — Lempia Summerfield Katz LLC

(57) ABSTRACT

A method of presenting music to a user of an electronic device comprises the step of providing score data representing the musical score of the piece of music in a graphical representation, audio data representing a recording of the piece of music, and music data representing one or more parts of parts of the piece of music in a digital format such as MIDI or MusicXML. The music data representing a part of the music that has been selected by the user is transformed into part sound signals using a sound generator. The part sound signals and audio sound signals are merged so as to obtain a merged sound signal in which the piece of music as represented by the music data file and by the audio data file are synchronized. Finally, and simultaneously, the sound of the piece of music using the merged sound signal is played audibly, the musical score is displayed on a display, and a sub-portion of the musical score corresponding to a passage of the piece of music which is presently audible is highlighted on the display.

23 Claims, 4 Drawing Sheets

(56) References Cited

U.S. PATENT DOCUMENTS

| | | | |
|---|---|---|---|
| 2003/0094093 A1* | 5/2003 | Smith | G10H 1/0058 |
| | | | 84/609 |
| 2005/0015258 A1* | 1/2005 | Somani | G10H 1/0008 |
| | | | 704/278 |
| 2005/0172787 A1 | 8/2005 | Tsurumi | |
| 2006/0117935 A1* | 6/2006 | Sitrick | G09B 15/023 |
| | | | 84/477 R |
| 2007/0209498 A1 | 9/2007 | Lindgren et al. | |
| 2008/0002549 A1* | 1/2008 | Copperwhite | G10G 1/00 |
| | | | 369/83 |
| 2008/0196575 A1* | 8/2008 | Good | G09B 15/04 |
| | | | 84/470 R |
| 2011/0023688 A1* | 2/2011 | Daisy | G09B 5/06 |
| | | | 84/483.1 |
| 2011/0203442 A1* | 8/2011 | Raveendran | G10G 1/00 |
| | | | 84/483.1 |
| 2011/0259176 A1* | 10/2011 | Pillhofer | G09B 15/002 |
| | | | 84/470 R |
| 2012/0227571 A1* | 9/2012 | Sasaki | G10G 1/00 |
| | | | 84/477 R |
| 2013/0319209 A1* | 12/2013 | Good | G09B 15/04 |
| | | | 84/483.2 |
| 2014/0000438 A1* | 1/2014 | Feis | G10G 1/00 |
| | | | 84/453 |
| 2015/0059558 A1* | 3/2015 | Morell | G10H 1/0025 |
| | | | 84/609 |
| 2015/0095822 A1* | 4/2015 | Feis | G10G 1/00 |
| | | | 715/765 |

* cited by examiner

```
<TrackName>Soprano</TrackName>
</Event>
- <Event>
<Delta>26880</Delta>
<Lyric>Ky</Lyric>
</Event>
- <Event>
<Delta>0</Delta>
<NoteOn Channel="1" Note="72"
Velocity="67" />
</Event>
- <Event>
<Delta>1440</Delta>
<NoteOff Channel="1" Note="72"
Velocity="0" />
</Event>
- <Event>
.....
```

METHOD OF PRESENTING A PIECE OF MUSIC TO A USER OF AN ELECTRONIC DEVICE

CROSS-REFERENCE TO RELATED APPLICATIONS

This application claims benefit of European patent application 14003079.2 filed Sep. 5, 2014. The full disclosure of this earlier application is incorporated herein by reference.

BACKGROUND OF THE INVENTION

1. Field of the Invention

The present invention generally relates to the field of tools and methods for presenting music. The disclosure particularly pertains to tablet computers or other electronic devices used for digital sheet music display and music audio playback.

2. Description of Related Art

A couple of years ago sheet music publishers began to publish music also in paperless digital formats. With the release of tablet appliances such as the iPad®, many different digital software applications (hereinafter "apps") for displaying sheet music have entered the market. The first of these apps displayed digital sheet music as stored in Portable Document Format (PDF) files. Soon afterwards these apps added the ability to annotate the sheet music with graphical markings. More recent apps added the capability, for use with suitable hardware platforms, to play an audio file simultaneously with displaying the sheet music.

Still later generations of tablet apps added more interactivity. For example, the NoteStar® app from Yamaha allows musicians to listen to music playing back in synchrony with a scrolling digital sheet music display.

So far all commercially available sheet music apps represent sheet music either in native app formats or standard cross-application formats like MusicXML and PDF files.

MusicXML files currently have no standard mechanism for synchronizing audio files to notation files for synchronized playback. Furthermore, MusicXML files represent music in a logical format structured around MIDI playback, rather than a visual format structured around display. This complicates the process of displaying sheet music on an electronic device in a form that captures the fine engraving details of a paper publication. In other words, the quality of the sheet music displayed on the electronic device is often poor if compared with a good paper publication of the same piece of music. For producing such paper publications huge efforts are often invested by the publishers to arrange the notes and other symbols in a manner that can be easily grasped by performers, students or music fans. This particularly applies to orchestral or other polyphonic music in which a plurality of parts are arranged one below the other on a single sheet to form a musical score.

The PDF format, on the other hand, is capable of representing sheet music in a high quality format. But since it does not contain, in contrast to the MusicXML format, any information that relates to the music as such, it has not been used to play an audio or video file simultaneously with displaying the sheet music.

For these reasons the sheet music apps currently available sacrifice, at least to some extent, the high layout quality of printed sheet music already available to the ability to play an audio or video file simultaneously with displaying the sheet music.

U.S. Pat. No. 7,239,320 B1 discloses a computer implemented method of presenting music to a user of an electronic device. This method makes it possible to display sheet music in a high quality graphical representation and to play an audio or video file simultaneously. To this end a hierarchical structure of bounding boxes is used to synchronize displayed sheet music to a musical performance recorded as audio or video file.

However, although this method is very helpful to compare a musical performance with corresponding sheet music, it cannot provide much help to musicians or students who want to improve their skills in performing a certain part in that piece of music. For example, if a chorister wants to better learn his part with the help of a good audio recording, it is usually difficult to clearly identify this part in the recording.

Prior art approaches use for such educational purposes a MIDI representation of the piece of music. Then it is easy to highlight a certain part by simply increasing the volume of the MIDI channel that corresponds to this particular part. But music produced on the basis of a MIDI file is often not satisfactory for a listener, because it lacks the charm and natural atmosphere of a recorded performance of real musicians. Amplifying a specific part in an audio recording is not possible because the audio recording is obtained by sampling an analog wave signal from which no specific parts can be isolated.

SUMMARY OF THE INVENTION

It is therefore an object of the invention to provide a method of presenting music to a user of an electronic device which may be helpful to him to learn a part of a piece of music.

It is a further object of the invention to provide such a method which supports a musician or student to identify more clearly a particular part if listening to a recording of a polyphonic piece of music.

These and other objects are achieved with a method in accordance with the present invention. The method comprises the step of providing at least following three data files to an electronic device. A score data file contains score data representing the musical score of the piece of music in a graphical representation, wherein the musical score comprises a plurality of parts. An audio data file contains audio data representing the piece of music as played by musicians in a format in which sampled analog sound signals are encoded. A music data file contains music data representing at least one of the plurality of parts of the piece of music in a digital format in which pitch and relative duration of sounds are encoded.

A user is allowed to select one of the parts that shall be acoustically highlighted when audibly playing the piece of music. The music data, which represent the part that has been selected by the user in step b), is then transformed into part sound signals using a sound generator. Audio sound signals are produced on the basis of the audio data. The part sound signals and the audio sound signals are merged so as to obtain a merged sound signal in which the piece of music as represented by the music data file and the piece of music as represented by the audio data file are synchronized. Finally, and simultaneously, the sound of the piece of music using the merged sound signal is played audibly, at least a portion of the musical score is displayed on a display, and a subportion of the musical score that corresponds to a passage of the piece of music which is presently audible is highlighted on the display.

BRIEF DESCRIPTION OF THE DRAWINGS

Various features and advantages of the present invention may be more readily understood with reference to the following detailed description taken in conjunction with the accompanying drawing in which.

The subject matter given herein includes references to commercial products offered under product names for which trademark rights may apply. Where applicable, such trademark rights are the property of their owners of record.

DESCRIPTION OF PREFERRED EMBODIMENTS

1. General Function of Tablet Computer

Figure 1:
FIG. 1 is top view on a tablet computer.

FIG. 1 is a schematic top view on a tablet computer 10 having a memory in which an app is stored that will be explained further below in more detail. The term app is used in this context synonymously for all kinds of computer programs irrespective of the programming language or the computer platform.

The tablet computer 10 as such is a conventional electronic handheld device that is provided, in this particular embodiment, with a touch sensitive display 12, loudspeakers 14, 16 and control buttons 18, 20. As a matter of course, also other types of computers may be used instead. The term computer is to be construed broadly and comprises mobile phones, notebooks, PCs or workstations, but also electronic devices with a specific function such as a keyboard in which the app is stored in a read-only memory.

In FIG. 1 it can be seen that a musical score of a piece of music, here the first page of a piano score 22 of the "Mass in C major" from L. v. Beethoven, is shown on the display 12. The piano score 22 comprises four staffs for the different voice parts and two staffs for the piano part. In this embodiment the page shown on the display 12 is an identical copy of a paper edition published by the applicant, and thus it has the same perfect layout as the paper edition. Thus a user of the tablet computer 10 who is already familiar with the paper edition, for example because he or she is sometimes singing in a choir, can easily track the music on the display. It may also be possible to show only a portion of this page on the display 12. One reason for doing this might be that the display 12 is too small to show the entire page.

While the first page of the piano score 22 is displayed, a professional recording of this piece of music is played back using the loudspeakers 14, 16. This recording may be obtained from a CD by compressing the audio data, for example, using the MP3 standard. The portion of the score 22 which is presently audible is highlighted on the display with the help of a grey or colored bar 24 which moves, synchronized with the music presently played, over the musical score 22.

If a user is interested in a particular part of this piece of music, e.g. the bass part of the choir, he may simply touch with one of his fingers the display 12 at a position where the bass staff is shown. This will be interpreted by the tablet computer 10 as a command to highlight the bass part while the music is still playing.

The tablet computer will now play the music, but with acoustically highlighting the part selected by the user. The user will hear not only the recording of the piece of music, but additionally the selected part in a MIDI representation that has been produced by a sequencer or another sound generator.

Figure 2:
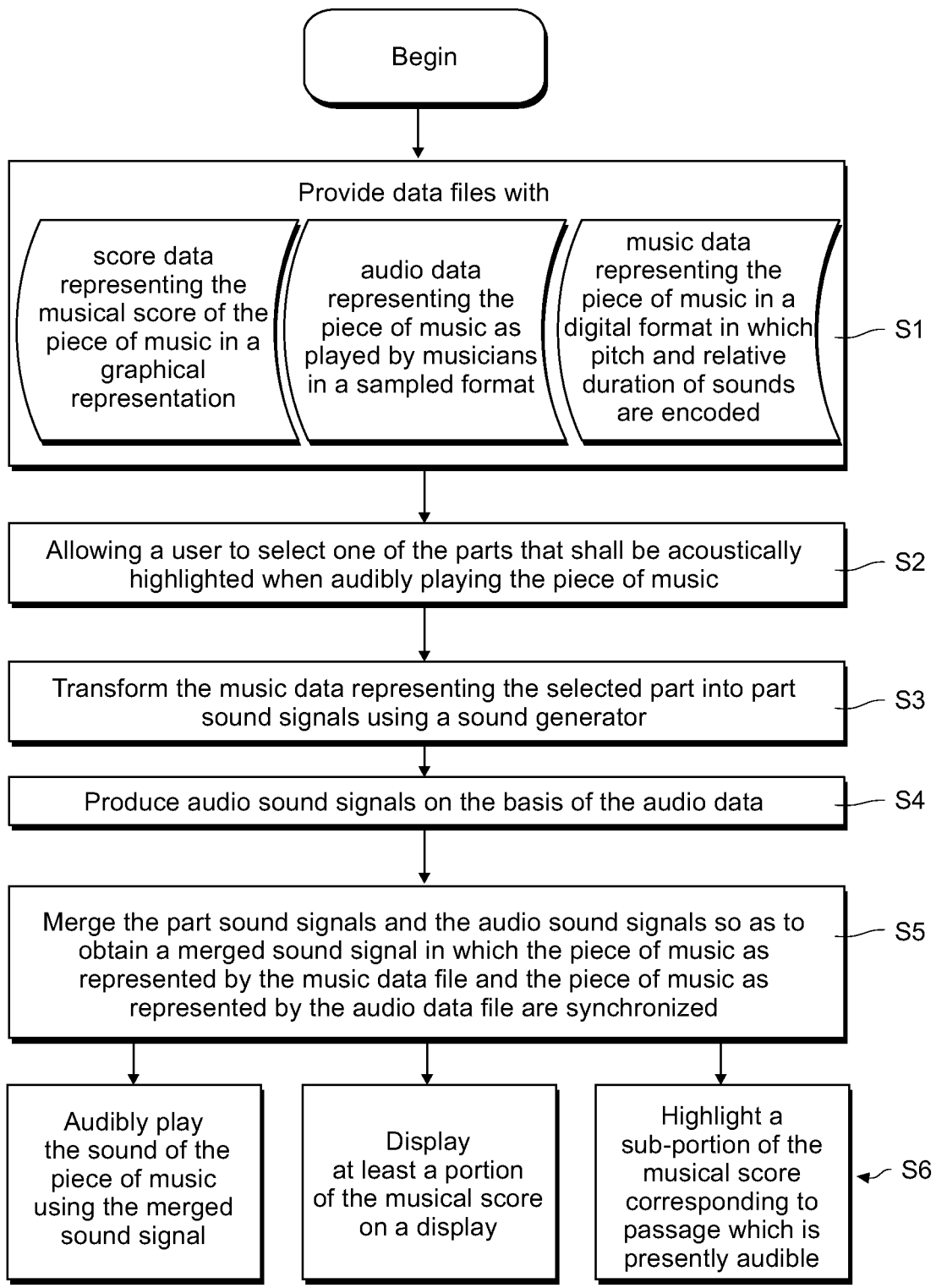
FIG. 2 is a flow diagram illustrating important steps that are carried out by the computer shown in FIG. 1.

How this is accomplished will be explained in the following with reference to FIG. 2 which is a flow diagram illustrating important steps that are carried out by the tablet computer 10.

2. Computer Program

In a first step S1, the tablet computer 10 is provided with three different data files. These data files may be downloaded from a server or may be provided to the tablet computer using a data carrier such as a USB stick, for example.

Figures 3, 4:
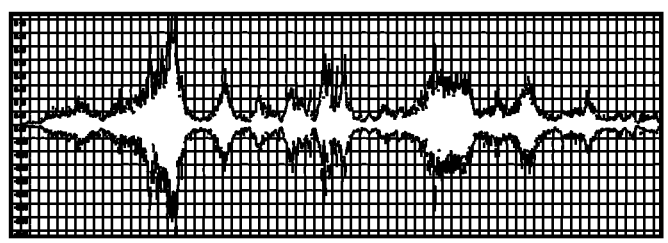
FIG. 3 is a page of a musical score in a graphical representation.
FIG. 4 is a graph illustrating an audio sound signal.

A first data file is a score data file containing score data that represent the musical score, which is in this particular embodiment a piano score, of the piece of music in a graphical representation as it is shown in FIG. 3. The term "graphical representation" denotes a format in which the score is encoded as graphical information and not as logic information. The score data file may be, for example, a TIFF (Tagged Image File Format) file that is used for storing raster graphics images, or a PDF file in which raster graphics images are embedded after filtering. It is also possible to embed the notes and other symbols of the musical score similar to embedded fonts.

A second data file is an audio data file containing audio data representing the piece of music as played by musicians in a format in which sampled analog sound signals are encoded. FIG. 4 shows an analog sound signal before it is sampled and encoded. It can be seen that in this analog signal it is not possible to identify the bass voice or and any other specific part.

The audio file may be an uncompressed data file such as a file in the Waveform Audio File Format (WAVE) or the Compact Disc Digital Audio Format (CDDA). Since the data storage capacity of the tablet computer 10 is restricted, it may be advantageous to use a compressed audio data file, for example a file in the MP3 format, the Advanced Audio Coding format (AAC), the Free Lossless Audio Codec format (FLAC) and the OGG/Vorbis format.

The third file provided in step S1 is a music data file containing music data that represent, in the embodiment shown, individually the four voice parts of the piece of music in a digital format in which pitch and relative duration of sounds are encoded. The most common file format of this kind is the MIDI format. MIDI, which is an acronym for Musical Instrument Digital Interface, is a technical standard for a protocol that allows a wide variety of electronic musical instruments, computers and other related devices to connect and communicate with one another.

MIDI carries event messages that specify notation, pitch and velocity, control signals for parameters such as volume, vibrato, audio panning, cues, and clock signals that set and synchronize tempo between multiple devices. These messages are sent to other devices where they control sound generation and other features. These data can also be recorded into a hardware or software device called a sequencer, which can be used to edit the data and to play them back at a later time.

Figures 5, 6:
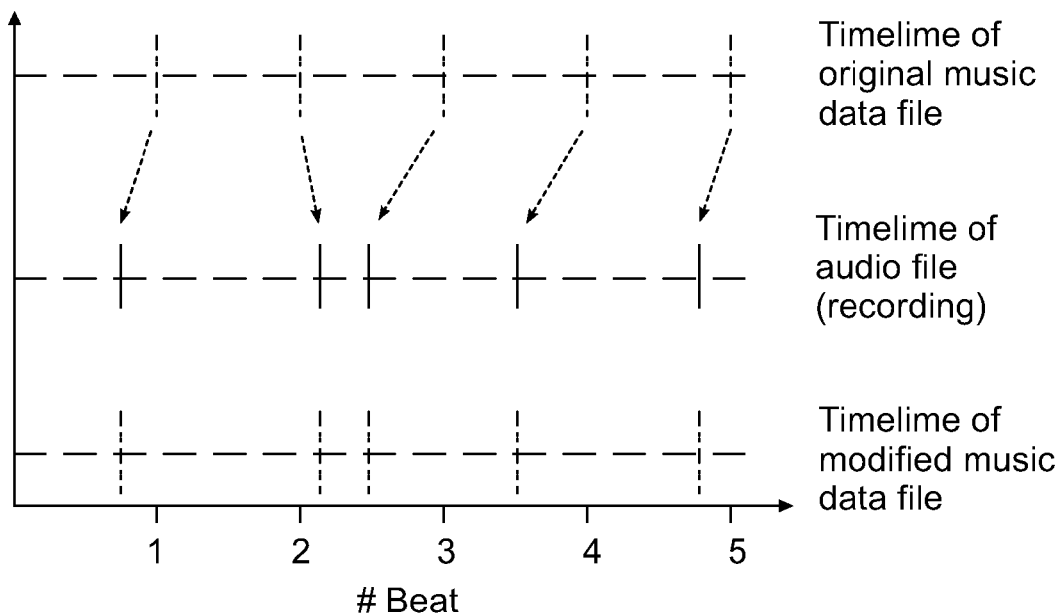
FIG. 5 is an excerpt from a MidiXML file.
FIG. 6 is a graph illustrating the synchronization of the music data file and the audio data file.

Since MIDI files are stored as a sequence of hexadecimal numerals, it may be more convenient to use the MidiXML format for the music data file instead. FIG. 5 is an excerpt from a MidiXML file representing the first note of Beethoven's piece of music shown in FIG. 3. These data may be transformed into a MIDI file, which may then be supplied to a sequencer to generate an analog sound signal. It is also possible to produce, on the basis of MidiXML data, a musical score using a notation program such as FINALE® that translates the MidiXML data into a graphical representation.

Here it is assumed that the music data file is a MidiXML file in which at least the pitch and the duration of the notes in the four voice parts of the piece of music are encoded in a manner that is illustrated in FIG. 5.

In a second step S2 the user is allowed to select one of the four voice parts that shall be acoustically highlighted when the piece of music is audibly played. As mentioned further above, this selection may be made by touching the staff on the display that corresponds to the selected voice part. Alternatively, the user may be able to make this selection in a menu that pops up if he presses one of the buttons 14, 16. Still further, the user may select his personal voice once at the beginning of the program. While the music is audibly played, an additional button labeled "Emphasize my voice", for example, appears on the display 12. The selection is then made by pressing this button. This approach has the advantage that the user does not have to identify his particular voice each time he wants to use the highlighting function.

In a third step S3 the music data, which represent the voice part that has been selected by the user in step S2, is transformed into part sound signals using a sound generator. To this end the tablet computer 10 transforms the MidiXML data of the music data file into MIDI data. The sound generator, which may be realized as a MIDI sequencer program module, transforms the MIDI data into an analog sound signal. The sound produced by the sound generator may be adapted to the part that shall be acoustically highlighted. Thus, if the user desires the bass voice to be acoustically highlighted, the sound generator may produce an artificial sound that resembles a human bass voice. Since—particularly in the case of human voices—such an artificial sound is sometimes unsatisfactory, a neutral sound, for example a piano sound, may be produced instead by the sound generator using the MIDI data. In an alternative embodiment, the tablet computer 10 is provided in step S1 not with a MidiXML file, but with a MIDI file. Then no MidiXML data have to be translated into MIDI data by the tablet computer 10.

In a fourth step S4 audio sound signals are produced by the computer 10 on the basis of the audio data contained in the audio data file. This may be accomplished with a conventional decoder that is capable of decoding the digital audio data so as to produce an analog audio signal as shown in FIG. 4.

In a next step S5 the part sound signals produced by the sound generator and the audio sound signals produced by the decoder are merged so as to obtain a merged sound signal in which the piece of music as represented by the music data file and the piece of music as represented by the audio data file are synchronized. The merging may be performed at a digital level or alternatively at an analog level.

3. Synchronization

A first approach for synchronizing the piece of music represented by the music data file and the audio data file will be described in the following with reference to Table 1.

TABLE 1

| Audio recording | | | MidiXML data | |
|---|---|---|---|---|
| | | | Δ Original | Δ Modified |
| # beat | time t [s] | # Ticks | Tempo [μs] | Tempo [μs] |
| 0 | 0 | 0 | 1360000 | 1361000 |
| 1 | 1.361 | 256 | 1360000 | 1395000 |
| 2 | 2.756 | 512 | 1360000 | 1241000 |
| 3 | 3.997 | 768 | 1360000 | 1322000 |
| 4 | 5.319 | 1024 | 1360000 | 1361000 |
| ... | ... | ... | | ... |

The left column in Table 1 represents the beat number in one of the bars of the piece of music. The second column indicates the time in seconds at which the beats occur in the audio recording. This information may be obtained "manually" by a person who listens to the recording and presses a button each time a beat is felt. It can be seen that although one might expect that the beats occur at strictly periodic intervals, they do not in the audio recording, perhaps because the conductor decided to modify the tempo between the beats.

The third column denotes the corresponding information in the original MidiXML file. Each beat is divided into 256 ticks, and the tempo information for each beat is 136000 μs. In contrast to the audio recording, the time sequence is described here by the time interval Δ between two consecutive beats.

In the original MidiXML data this time interval Δ is 1360000 μs=1.36 s for each beat. Therefore, if one would transform the MidiXML file into a MIDI file, produce an audio sound and play it together with the audio recording, the two sounds would not match, because the audio sound obtained from the MIDI data would be perfectly regular, whereas the audio recording contains tempo modifications.

Therefore the MidiXML data relating to the time interval Δ is modified such that the two sounds are synchronized. To this end the modified time interval data Δ for beat n is changed such that it is equal to the difference $d=t_n-t_{n-1}$. In this manner the duration Δ of sounds encoded in the digital music file is determined such that the piece of music as represented by the music data file and the piece of music as represented by the audio data file are synchronous when simultaneously played.

FIG. 6 shows a graph that illustrates this way of synchronizing the timeline of the MidiXML data file with the timeline of the audio data file. In the original MidiXML data file the beats occur strictly periodically, whereas in the audio recording the beats occur somewhat irregularly. By modifying the time intervals between the beats in the MidiXML file, it is possible to match the data such that music produced on the basis of the music data file and music produced on the basis of the audio file is synchronized.

Another way of synchronizing the audio data file with the music data file is to provide a separate synchronization file to the tablet computer 10. This synchronization file contains synchronization data establishing a time correlation between the music data and the audio data. These synchronization data are used by the sound generator when it transforms the music data into part sound signals in step S3.

4. Synchronized Playback and Part Highlighting

In a final step S6 the sound of the piece of music is audibly played via the loudspeakers 14, 16 using the merged sound signal. Simultaneously at least a portion of the piano score 22 is displayed on the display 12, and a portion of the musical score that corresponds to a passage of the piece of music which is presently audible is highlighted using the bar 24.

5. Volume Control

The volume of the sound that is produced by the sound generator on the basis of the music data file is originally not adapted to the volume of the sound produced by the decoder on the basis of the audio data. Thus, if the music of the recording becomes very loud at certain passages, it might be impossible to discern the additional sound that is merged into the recording for highlighting a certain part of the music.

Therefore it may be considered to appropriately modify sound volume data, which are contained in the music data, at the time the part sound signals and the audio sound signals are merged in step S5. Usually it will be desirable to increase the volume of the part sound signals with increasing volume of the audio sound signals, and vice versa. But also more complicated and non-linear schemes may be applied during the modification of the volume data.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

The invention claimed is:

1. A method of presenting a piece of music to a user of an electronic device, said method comprising the following steps:
   a) providing the following data files to the electronic device:
      a score data file containing score data representing the musical score of the piece of music in a graphical representation, wherein the musical score comprises a plurality of parts,
      an audio data file containing audio data representing the piece of music as played by musicians in a format in which sampled analog sound signals are encoded,
      a music data file containing music data representing at least one of the plurality of parts of the piece of music in a digital format in which pitch and duration of sounds are encoded,
   b) allowing a user to select one of the parts that shall be acoustically highlighted when audibly playing the piece of music;
   c) transforming the music data, which represent the part that has been selected by the user in step b), into part sound signals using a sound generator;
   d) producing audio sound signals on the basis of the audio data;
   e) merging the part sound signals and the audio sound signals so as to obtain a merged sound signal in which the piece of music as represented by the music data file and the piece of music as represented by the audio data file are synchronized;
   f) simultaneously
      audibly playing the sound of the piece of music using the merged sound signal,
      displaying at least a portion of the musical score on a display and
      highlighting on the display a sub-portion of the musical score that corresponds to a passage of the piece of music which is presently audible.

2. The method of claim 1, wherein the digital format is a MIDI format and the music data file is a MIDI file.

3. The method of claim 1, wherein the digital format is a MusicXML format and the music data file is a MusicXML file.

4. The method of claim 1, wherein in the digital format an absolute duration of sounds is encoded, and wherein the duration of sounds is determined such that the piece of music as represented by the music data file and the piece of music as represented b the audio data file are synchronous when simultaneously played in step f).

5. The method of claim 1, wherein a synchronization file is provided to the electronic device in step a), said synchronization file containing synchronization data establishing a time correlation between the music data and the audio data, and wherein the synchronization data are used by the sound generator when transforming the music data into part sound signals in step c).

6. The method of claim 1, wherein the audio data file is an uncompressed data file provided in a format selected from the group consisting of: Waveform Audio File Format (WAVE) and Compact Disc Digital Audio Format (CDDA).

7. The method of claim 1, wherein the audio data file is a compressed data file provided in a format selected from the group consisting of: MP3 format, Advanced Audio Coding format (AAC). Free Lossless Audio Codec format (FLAC) and Theora.

8. The method of claim 1, wherein the music data comprise sound volume data, and wherein, when merging the part sound signals and the audio sound signals in step e), the sound volume data are modified depending on a volume of the audio sound signals.

9. The method of claim 8, wherein the volume of the part sound signals is increased with increasing volume of the audio sound signals.

10. The method of claim 1, wherein the audio data file is contained in a multimedia container file that contains also a video data file.

11. A non-transitory computer readable memory with a computer program stored thereon, the computer program configured to cause a computer to perform the following steps:
   a) loading the following data files to the computer:
      a score data file containing score data representing the musical score of the piece of music in a graphical representation, wherein the musical score comprises a plurality of parts,
      an audio data file containing audio data representing the piece of music as played by musicians in a format in which sampled analog sound signals are encoded,
      a music data file containing music data representing at least one of the plurality of parts of the piece of music in a digital format in which pitch and duration of sounds are encoded,
   b) allowing a user to select one of the parts that shall be acoustically highlighted when audibly playing the piece of music;
   c) transforming the music data, which represent the part that has been selected by the user in step b), into part sound signals;
   d) producing audio sound signals on the basis of the audio data;

e) merging the part sound signals and the audio sound signals so as to obtain a merged sound signal in which the piece of music as represented by the music data file and the piece of music as represented by the audio data file are synchronized;

f) simultaneously
audibly playing the sound of the piece of music using the merged sound signal using a loudspeaker or earphones,
displaying at least a portion of the musical score on a display and
highlighting on the display a sub-portion of the musical score that corresponds to a passage of the piece of music which is presently audible.

12. The computer readable memory of claim 11, wherein the digital format is a MIDI format and the music data file is a MIDI file.

13. The computer readable memory of claim 11, wherein the digital format is a MusicXML format and the music data file is a MusicXML file.

14. The computer readable memory of claim 11, wherein in the digital format an absolute duration of sounds is encoded, and wherein the duration of sounds is determined such that the piece of music as represented by the music data file and the piece of music as represented by the audio data file are synchronous when simultaneously played in step f).

15. The computer readable memory of claim 11, wherein a synchronization file is provided to the electronic device in step a), said synchronization file containing synchronization data establishing a time correlation between the music data and the audio data, and wherein the synchronization data are used by the sound generator when transforming the music data into part sound signals in step c).

16. The computer readable memory of claim 11, wherein the audio data file is an uncompressed data file provided in a format selected from the group consisting of: Waveform Audio File Format (WAVE) and Compact Disc Digital Audio Format (CDDA).

17. The computer readable memory of claim 11, wherein the audio data file is a compressed data file provided in a format selected from the group consisting of: MP3 format, Advanced Audio Coding format (AAC), Free Lossless Audio Codec format (FLAC) and Theora.

18. The computer readable memory of claim 11, wherein the music data comprise sound volume data, and wherein, when merging the part sound signals and the audio sound signals in step e), the sound volume data are modified depending on a volume of the audio sound signals.

19. The computer readable memory of claim 18, wherein the volume of the part sound signals is increased with increasing volume of the audio sound signals.

20. The computer readable memory of claim 11, wherein the audio data file is contained in a multimedia container file that contains also a video data file.

21. The computer readable memory of claim 11, wherein the computer is a tablet computer.

22. The computer readable of claim 11, wherein the computer readable memory is a part of the computer.

23. A method of supporting a user to learn a piece of music, comprising the following steps:
a) displaying at least a portion of a musical score of the piece of music on a display, wherein the musical score comprises a plurality of parts;
b) allowing a user to select one of the parts that shall he acoustically highlighted when audibly playing the piece of music;
c) producing audio sound signals on the basis of audio data representing the piece of music as played by musicians in a format in which sampled analog sound signals are encoded;
d) producing part sound signals using a sound generator and music data which represent the part that has been selected by the user in step b);
e) merging the part sound signals and the audio sound signals so as to obtain a merged sound signal in which the piece of music as represented by the music data file and the piece of music as represented by the audio data file are synchronized;
f) audibly playing the sound of the piece of music using the merged sound signal;
g) highlighting on the display a sub-portion of the musical score that corresponds to a passage of the piece of music which is presently audible.

* * * * *

UNITED STATES PATENT AND TRADEMARK OFFICE
CERTIFICATE OF CORRECTION

PATENT NO. : 9,601,029 B2  Page 1 of 1
APPLICATION NO. : 14/845519
DATED : March 21, 2017
INVENTOR(S) : Simon Gebauer It is certified that error appears in the above-identified patent and that said Letters Patent is hereby corrected as shown below:

In Claim 4:
Column 8, Line 15 – "b" should be replaced with -- by --.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*